United States Patent [19]

Saito

[11] 4,321,633

[45] Mar. 23, 1982

[54] TAPE RECORDER

[75] Inventor: Shoichi Saito, Tokyo, Japan

[73] Assignee: Olympus Optical Co. Ltd., Tokyo, Japan

[21] Appl. No.: 82,632

[22] Filed: Oct. 5, 1979

[30] Foreign Application Priority Data

Oct. 9, 1978 [JP] Japan .................................. 53/124503
Oct. 9, 1978 [JP] Japan .................................. 53/124504

[51] Int. Cl.³ ...................... G11B 15/02; G11B 15/18; G11B 31/00
[52] U.S. Cl. .......................................... 360/69; 360/62; 360/72.2; 360/74.4; 360/79; 434/319; 434/342
[58] Field of Search ........................ 360/69, 79, 62, 63, 360/27, 72.2, 74.4; 35/35 C, 9 R, 9 D

[56] References Cited

U.S. PATENT DOCUMENTS

| 3,587,180 | 6/1971 | Richt | 360/74.4 |
| 3,950,782 | 4/1976 | Carey et al. | 360/72.2 |
| 3,955,466 | 5/1976 | Goldmark | 360/74.4 |
| 3,996,671 | 12/1976 | Foster | 360/72.2 |
| 4,121,264 | 10/1978 | Kishi et al. | 360/79 |
| 4,199,724 | 4/1980 | Kondo | 360/137 |
| 4,206,488 | 6/1980 | Nakayama et al. | 360/62 |
| 4,210,785 | 7/1980 | Huber et al. | 179/100.1 PS |

Primary Examiner—Alfred H. Eddleman
Attorney, Agent, or Firm—Stevens, Davis, Miller & Mosher

[57] ABSTRACT

A miniature tape recorder with a two-channel magnetic head and a selecting member for selecting one of combinations of channels for recording and reproducing without releasing a record-actuating member and a reproduction-actuating member, which tape recorder can be used to form an inexpensive study machine by connecting it to an outside study unit for using a two-channel study tape, wherein study step cannot proceed unless a student thoroughly understands the answer to the question of one study step.

5 Claims, 8 Drawing Figures

Position of Pause Button

FIG. 7

TAPE RECORDER

BACKGROUND OF THE INVENTION

1. Field of the Invention

This invention relates to a tape recorder, and more particularly to a tape recorder which can be used with a tuner for broadcasting waves and a study unit.

2. Description of the Prior Art

There are various study machines using tape recorders, which have been known heretofore. For instance, in a tape recorder with the so-called language laboratory (LL) functions, the arrangement is generally such that the voice of a student is recorded while reproducing the voice of a teacher, and then the voices of the teacher and the student are simultaneously produced for effecting a comparison thereof. In this case, the practice of pronunciation may be possible but it is difficult to enhance the understanding of the contents of what was pronounced. On the other hand, with a comparatively large-scale audio-visual facility installed in an educational institution, it is possible to separately direct questions to individual students, to compare answers from the students in response to the questions with pre-recorded answers, and then to determine whether or not specific students are allowed to proceed to a next study step. With such facility, positive studies for enhancing the understanding of the contents of each subject are possible. However, there is a shortcoming in that the facility is of large scale with complex structure and expensive, so that students cannot make similar studies at their own homes.

SUMMARY OF THE INVENTION

Therefore, an object of the present invention is to provide an extremely small tape recorder which can be put in a dress shirt pocket and yet is capable of effecting efficient studies at the homes of individual students by allowing changes of combinations of recording and reproducing channels in a variety of modes.

More particularly, according to the present invention, there is provided a tape recorder comprising a two-channel magnetic head, two amplifying circuits, a record-actuating member, a reproduction-actuating member, said members being operable to effect recording and reproducing, and a selecting member operable without releasing said record-actuating member and said reproducing-actuating member so as to select one of different combination of channels for recording and reproducing to be effected upon operating said record-actuating member and said reproduction-actuating member, said selecting member having a plurality of selective positions including one selecting position where reproduced signals from individual channels of said two-channel magnetic head are applied to amplifying circuits of the corresponding individual channels for enabling simultaneous reproduction of signals of said channels.

With the tape recorder of the present invention, questions are recorded in a first track of magnetic tape, while answers to the questions are recorded in a second track of the tape. Whereby, as a student listens to the question and answers to the question after carefully thinking the question, it is possible to determine whether the answer coincides or not with the correct answer recorded in the second track simply by switching the channels. Thus, efficient audio-visual studies which have been possible only by a comparatively large-scale facility can now be easily effected at the student's own home. This is an outstanding advantage of the present invention. On the other hand, a conventional study tape having questions and answers recorded on one track in an alternate fashion does not provide a chance for a student to cultivate a habit of seriously thinking the answer.

In a comparatively large-scale tape recorder for special purposes, a control track is sometimes provided on a magnetic tape for recording control signals for controlling the operation of the tape recorder, and a control circuit is provided in the tape recorder for detecting the control signal and generating control outputs. However, the provision of such a control circuit in the tape recorder makes the miniaturization of the tape recorder difficult, and even with such a control circuit, it is difficult to effect comparatively complex controls. Thus, it has been a common practice heretofore to record only timing pulses in the control track for detecting the beginning of programs.

Another object of the present invention is to facilitate control of tape recorder operations in various modes, without making the tape recorder large, while using an extremely small tape recorder, such as a tape recorder which is small enough to put it in the pocket of a dress shirt.

More particularly, a tape recorder according to the present invention is characterized by comprising a magnetic head having channels corresponding to a first track and a second track of a magnetic tape for producing analog audio signals recorded on the first track and digital control signals recorded on the second track, said digital control signals relating to contents of said analog audio signals on the first track and controlling operations of one of the tape recorder and an outside unit connected to the tape recorder, a reproducing means for reproducing the analog audio signals of the first track, an output terminal for delivering the digital control signals of the second track to the outside unit, and a control input terminal for receiving control output signals generated by said outside unit based on the digital control signals of the second track, so as to control the operation of the tape recorder in response to said control output signals received at said control input terminal.

Thus, according to the present invention, the control circuit which has been built in the tape recorder is provided in the outside unit, so that the tape recorder need not be large. In addition, if the tape recorder is used together with such an outside unit which includes a microcomputer, a keyboard, and an interface, the tape recorder can be operated in a complicated mode that has been considered impossible even with a large-scale tape recorder of conventional type.

BRIEF DESCRIPTION OF THE DRAWING

For a better understanding of the invention, reference is made to the accompanying drawing, in which.

Throughout different figures of the drawing, 1 is a tape recorder, 2 is a cover, 3 is a record-actuating member, 4 is a reproduction-actuating member, 5 is a stop member, 6 is a fast-forward-rewind-queue-review-actuating (FFRQR-actuating) member, 7 is a microphone, 8 is a connecting terminal for an outside microphone, 9 is an output terminal, 10 is a pause button, 11 is a mode selecting switch, 12 and 13 are guide pins, 14 is an actuating pin, 15 is a changeover lever, 16 is a pivot pin, 17 and 18 are movable contact points, 19 is a fixed contact point, 20 is a two-channel head, 21 is a printed-circuit plate, 22 is a speaker, 23 is a battery, 24 is a battery chamber, 25 is a group of terminals, 26 is a pre-amplifier, 27A and 27B are main amplifiers, 28 is a servo-amplifier, 29 is a motor, 30 is a variable resistor, 31 is a tuner unit, 32 is a tuner circuit, 33A through 33D are terminals, 34 is s study unit, 35 is a microcomputer, 36 is a keyboard, 37 is a display means, 38 is an interface, 39A through 39D are terminals, and 40A and 40B are first and second tracks of a magnetic tape, respectively.

DESCRIPTION OF THE PREFERRED EMBODIMENTS

Referring to FIGS. 1 through 4 illustrating an embodiment of the present invention, a tape recorder 1 of this embodiment has a cassette chamber to be closed and opened by a cover 2. A record-actuating member 3, a reproduction-actuating member 4, and a stop member 5 are aligned on one sidewall of the tape recorder. On the top portion of the tape recorder, there are disposed a fast-forward-rewind-queue-review-actuating (to be referred to as the "FFRQR-actuating", hereinafter) member 6, a microphone 7, a connecting terminal 8 for an outside microphone, an output terminal 9, and a pause button 10. As will be described later, the pause button 10 of this embodiment is also used as a selecting member for combination of different channels.

With the tape recorder as illustrated in FIGS. 1 through 4, reproduction or playing of signals on a magnetic tape can be effected by pressing only the reproduction-actuating member 4 toward the inside of the tape recorder in the width direction thereof; and recording of voice or audio signals from the built-in microphone 7 or from an outside microphone connected to the terminal 8 can be effected by pressing both the reproduction-actuating member 4 and the record-actuating member 3 toward the inside of the tape recorder. The stop member 5 can release the reproduction-actuating member 4 from a locked position thereof for reproducing operation, so as to return the member 4 to a stop position thereof; and the stop member 5 can also release both the reproduction-actuating member 4 and the record-actuating member 3 from locked positions thereof for recording, so as to return them to their stop positions, respectively.

A mode selecting switch 11 is so related with the record-actuating member 3 that, when the member 3 is pressed toward the inside of the tape recorder, the electric circuit of the tape recorder is changed over from the reproducing mode to the recording mode. More particularly, guide pins 12 and 13 fixed to a chassis (not shown) of the tape recorder slidably guide an inwardly extended portion of the member 3, and an actuating pin 14 is fixed to the inwardly extended portion of the member 3. A change-over lever 15 is swingably supported by a pivot pin 16 fixed to the chassis, and one end of the lever 15 engages said actuating pin 14, while the opposite end of the lever 15 is bifurcated so as to form movable contact points 17 and 18. A fixed contact point 19 of the mode selecting switch 11 is disposed between the two movable contact points. The fixed contact point 19 is normally kept in electric contact with the movable contact point 17 for maintaining the electric circuit of the tape recorder ready for the reproducing mode. When the record-actuating member 3 is pressed toward the inside of the tape recorder, the actuating pin 14 is moved so as to turn the change-over lever 15 around the pivot pin 16, for removing the movable contact point 17 from the fixed contact point 19 and bringing the other movable contact point 18 into electric contact with the fixed contact point 19, whereby the electric circuit of the tape recorder is switched to the recording mode.

As regards the FFRQR-actuating member 6, when the tape recorder is in a stop mode, a displacement of the member 6 in a width direction thereof causes fast forwarding while a pressing of the member 6 in a length direction thereof toward the inside of the tape recorder causes rewinding; and when the tape recorder is in a reproducing mode, the displacement of the member 6 in the width direction thereof causes queue while the pressing of the member 6 in the length direction thereof toward the inside of the tape recorder causes review, respectively. Such arrangement of the FFRQR-actuating member 6 is known.

As mentioned above, the pause button 10 of this embodiment is also used as a selecting member of combination of different channels. More particularly, the pause button 10 can assume one of linearly arranged three selective positions, i.e., a first position X, a neutral position Y, and a second selective position Z. The neutral position Y is a normal pause position for interrupting the tape feeding during recording or reproducing operation. Thus, with the pause button held at the first and second selective positions X and Z, no interruption of the tape feeding is effected, but the tape can be driven in any of the recording, reproducing, first forwarding, rewinding, reviewing, and queueing modes, depending on the requirement at the moment, while the combination of channels being used for the recording and reproducing varies depending on selective position assumed by the pause button.

Figure 1:
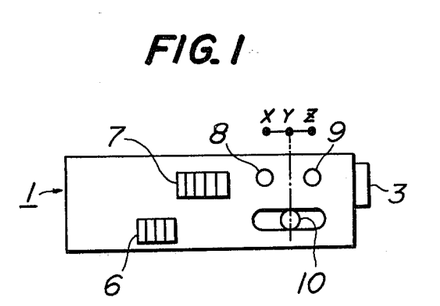
FIGS. 1 through 4 are a plan view, a front view, a partial side view, and a bottom view of a tape recorder according to the present invention, respectively.
Figure 2:
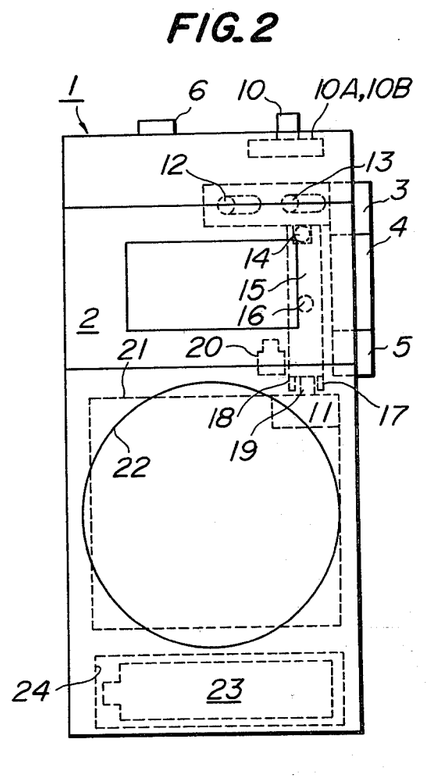
Figure 3:
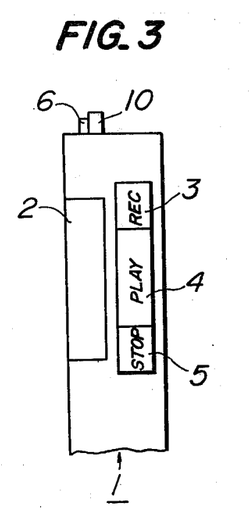
Figure 4:
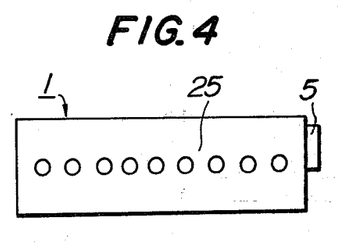

The tape recorder embodying the present invention, as illustrated in FIGS. 1 through 4, further comprises a two-channel magnetic head 20, a printed circuit plate 21 forming the electric circuit of the tape recorder, a speaker 22, and a battery chamber 24 for housing a battery 23. The bottom surface of the tape recorder has a terminal group 25 consisting of a plurality of connecting terminals, as shown in FIG. 4. The connecting terminals of the group 25 are similar to connecting terminals of an extremely small micro cassette tape recorder manufactured and sold (under a trademark of "PEARLCORDER") by the successor of the present invention, in that the terminals facilitate mechanical and electrical connection with various outside units for greatly expanding the practical utility of the tape recorder.

Figure 5:
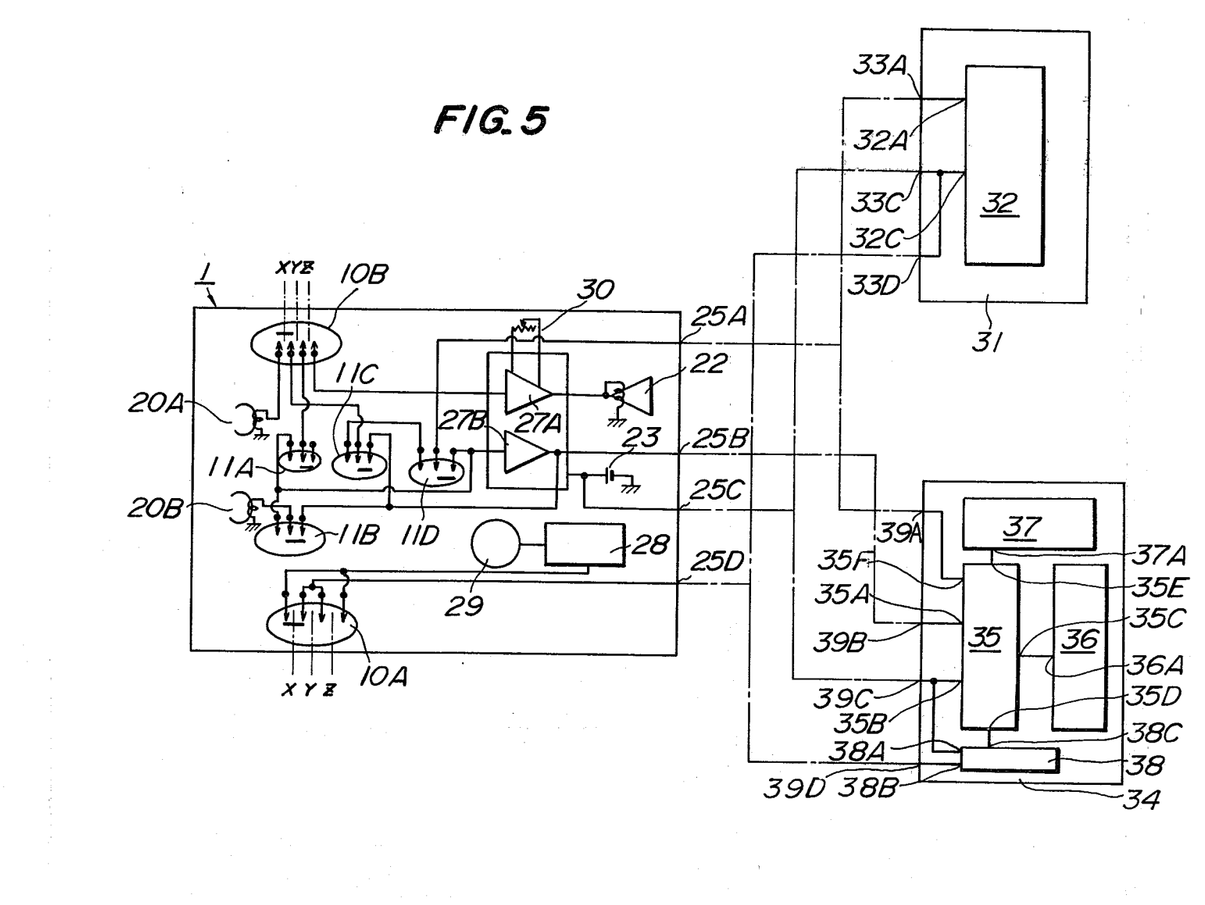
FIG. 5 is a block diagram of an embodiment of electric circuit for a tape recorder and outside units according to the present invention.

As shown in the left-hand side of FIG. 5, the electric circuit of the tape recorder of the aforesaid embodiment comprises the two-channel magnetic head 20 for a first channel 20A and a second channel 20B, switches 10A and 10B relating to the pause button 10, switches 11A, 11B, 11C, and 11D gang operating by the mode selecting switch 11, two main amplifiers 27A and 27B possibly made of suitable integrated circuits, the speaker 22 connected to the main amplifier 27A, the battery 23, and a motor 29 with a servo-amplifier 28 therefor. The terminal group 25 at the bottom of the tape recorder includes an outside input terminal 25A to be connected to the input side of the main amplifiers 27A and 27B, a control signal output terminal 25B connected to the output side of the main amplifier 27B which is not connected to the speaker 22, a power source output terminal 25C connected to positive electrode of the battery 23, and a control input terminal 25D connected to the input side contact points of the pause switch 10A. The pause switch 10A selectively completes or interrupts the power supply to the servo-amplifier 28 for controlling the driving motor 29 for feeding the magnetic tape, thereby effecting ON or OFF of the pause mode.

The switch 10B which is also actuated by the pause button 10 is for altering the combination of the channels being used for recording and reproducing, as will be described hereinafter.

The gain of the main amplifier 27A connected to the speaker 22 can be controlled by a variable resistor 30. The outside input terminal 25A may be related to a switch, which is not shown, in such a manner that when the tape recorder is connected to an outside unit, output signals from the outside unit can be applied to the main amplifier 27A or to the main amplifiers 27A and 27B, while when the tape recorder is not connected to any outside unit, output signals of the microphone 7 (not shown in FIGS. 3 and 4) can be applied to the main amplifier 27A or to the main amplifiers 27A and 27B. Another change-over switch, which is not shown, may be related to either the power source output terminal 25C or the control input terminal 25D in such a manner that, when the tape recorder is not connected to the outside unit, the power supply from the battery 23 to the motor 29 can be controlled by the outside unit, while when the tape recorder is not connected to any outside unit, the battery 23 can be directly connected to the pause switch 10A.

In the tape recorder of the aforesaid construction under the illustrated mode, the switches 11A through 11D of the mode selecting switch 11 are in their recording positions, and the pause switches 10A and 10B are at the positions corresponding to the aforesaid first selective position X of the pause button 10. As pointed out before, when the tape recorder is not connected to any outside unit, the input side contact point of the pause switch 10A is directly connected to the battery 23 by the change-over switch which is not shown. Accordingly, the tape recorder effects the recording under the illustrated condition.

More specifically, the input signals from the outside input terminal 25A or the input signals from the microphone 7 for recording are applied to the main amplifier 27A on the one hand, and then reproduced by the speaker 22 after being regulated at a desired level by the variable resistor 30, so that monitoring of the recording can be effected at the desired level. The input signals for recording are also applied to the other main amplifier 27B through the switch 11D for mode selection. The output signals of the main amplifier 27B are applied to the second channel 20B of the magnetic head 20 through the mode selecting switch 11B, and also to the first channel 20A of the magnetic head 20 through the mode selecting switch 11C and the switch 10B, so that the signals are simultaneously recorded on the two tracks of the magnetic tape. Accordingly, the tape thus recorded can be used for reproduction or playing by another monoral tape recorder adapted to the magnetic tapes of the identical standard.

If the pause button 10 is moved to the neutral position Y during the aforesaid recording operation, the switch 10A interrupts the circuit from the battery 23 to the servo-amplifier 28. As a result, the feeding of the magnetic tape is interrupted, and the tape recorder is turned to the pause mode.

If the pause button 10 is further moved to the second selective position Z, the switch 10A actuates the motor 29 as in the case of the position X, for resuming the tape driving. However, the switch 10B simultaneously interrupts the connection from the main amplifier 27B to the first channel 20A of the magnetic head 20. As a result, the recording is effected only on the second channel 20B. This operational mode is used for recording answers to questions in preparing a study tape by a user himself as will be described later.

When only the mode selecting switch 11 is turned to the reproducing or playing position without operating the pause button 10, the reproduced output signals from the magnetic tape corresponding to the second channel 20B are applied to the speaker 22 through the switches 11B, 11A, 10B, and the main amplifier 27A, for reproduction or play by the speaker 22 after being regulated to a desired playing level by the variable resistor. Meanwhile, the reproduced signals from the magnetic tape corresponding to the first channel 20A are not delivered to anywhere, because the switch 10B is at the second selective position Z.

On the other hand, if the pause button 10 is so actuated during the reproducing or playing mode as to return the switches 10A and 10B to the first selective position X, the reproduced signals from the magnetic tape corresponding to the first channel 20A are applied to the speaker 22 through the switch 10B, the switches 11C, 11D, and main amplifier 27A, for playing at a desired level. Meanwhile, the reproduced signals from the magnetic tape corresponding to the second channel 20B are applied to the terminal 25B through the switch 11B and the main amplifier 27B. Accordingly, at this moment, the reproduced output from the second channel are not reproduced by the speaker 22 of the tape recorder, but can be reproduced by an outside speaker if such outside speaker is connected to the terminal 25B.

Therefore, the tape recorder 1 having the circuit as shown in the left-hand side of FIG. 5 can be operated substantially in the same manner as a regular tape recorder, so as to provide a complete interchangeability with other tape recorders.

More particularly, when the pause button 10 is set at the first selective position X, recording can be effected on the two channels in the same manner as regular tape recorders, and there is no difficulty of interchangeability in reproducing the signals from the tape thus recorded by using another tape recorder adapted to the tape of the identical standard.

On the other hand, during reproduction or playing, if the pause button 10 is at the first selective position X, the speaker 22 plays the signals recorded on the first channel, while if the pause button 10 is at the second selective position Z, the speaker 22 plays the signals recorded in the second channel. Thus, when a tape recorded by another regular tape recorder is reproduced or played by the tape recorder of the present invention, the output level as reproduced may be one half, so that the output of the main amplifier 27A may be set at a comparatively high level for meeting such reproduced level.

The tape recorder according to the present invention can be used substantially in the same manner as that of regular tape recorders, and in addition, can be used as a simple study machine.

Figure 6:
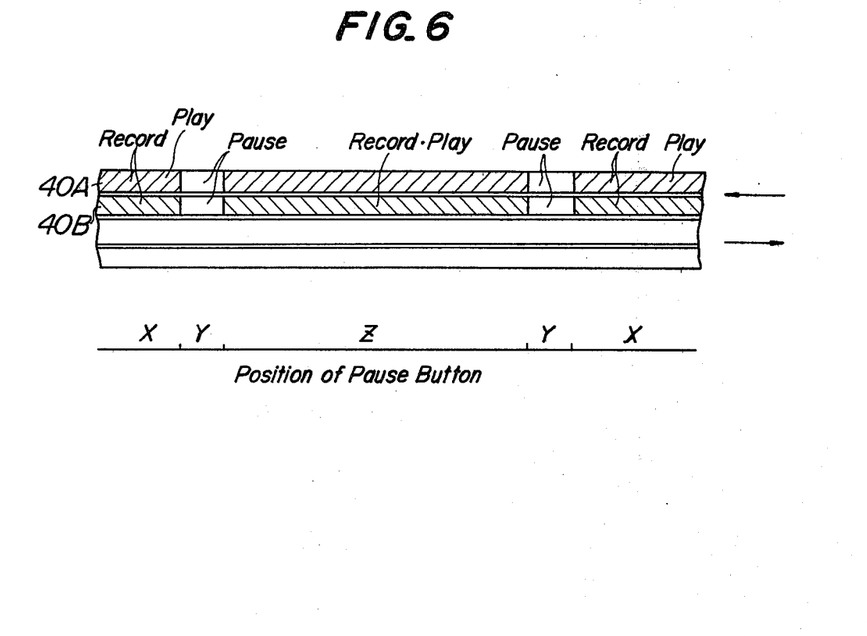
FIGS. 6 and 7 are explanatory diagrams of a study tape for use with a tape recorder according to the present invention when the tape recorder is used as one unit of a study machine, arrows at the right side illustrating feed direction of each of four tracks with respect to a magnetic head.

More specifically, referring to FIG. 6, to make a teaching material tape or a study tape, the pause button 10 is set at the first selective position X for recording questions on both the first and second tracks 40A and 40B of a magnetic tape. Then, the pause button 10 is set at the second selective position Z for recording correct answers on the second track 40B only. To carry out the actual study by using the study tape thus prepared, the pause button 10 is returned to the first selective position X, for playing the questions only. Then, the pause button 10 is moved to the neutral position Y for allowing a student to think about the question, and after the student's own answer is worked out, the pause button 10 may be moved to the second selective position Z for reproducing the correct answer recorded, so as to determine whether the student's answer is correct or not. This manner of studying cultivates a habit of the students to always think, which is an outstanding effect that cannot be achieved by conventional study tapes and conventional study tape recorders.

The top right block of FIG. 5 shows a tuner unit 31 as an example of outside units to be connected to the tape recorder according to the present invention. The tuner unit 31 comprises a tuner circuit 32 and terminals 33A, 33C, and 33D corresponding to the tape recorder terminals 25A, 25C, and 25D, respectively. The terminal 33A is connected to an output terminal 32A of the tuner circuit 32. The terminal 33C is connected to a power source input terminal 32C of the tuner circuit 32. The terminal 33D to be connected to the terminal 25D of the tape recorder 1 is directly connected to the aforesaid terminal 33C within the tuner unit 31.

As can be seen from the foregoing, when the tuner unit 31 is connected to the tape recoder 1, the connection between the microphone 7 and the main amplifier 27A and between the battery 23 and the pause switch 10A are interrupted. Meanwhile, the terminal 25A is provided with output signals from the tuner circuit 32, and the battery 23 is connected to the pause switch 10A through the terminals 33C and 33D of the tuner unit 31. Accordingly, when the pause button 10 is at the first selective position X, the output signals from the tuner circuit 32 can be recorded on the magnetic tape tracks corresponding to the two channels 20A and 20B in the aforesaid manner.

Accordingly, the tape recorder 1 of FIG. 5 can be operated as a regular tape recorder with a radio by connecting to the tuner unit 31.

Furthermore, if the tuner unit 31 is provided with a speaker and another terminal, which terminal is connected to the input of the speaker thus provided through a variable resistor while being connected to the terminal 25B of the tape recorder 1, stereo signals recorded on a magnetic tape can be reproduced and played as stereophonic sounds by a combination of the speaker 22 of the tape recorder 1 and the speaker thus provided in the tuner unit. Besides, when the pause button 10 is at the first selective position X, the output from the first channel 20A and the second channel 20B are separately amplified by the main amplifiers 27A and 27B, so that the tape recorder 1 connected to the tuner unit with the aforesaid provisions can be used as a tape recorder with a radio capable of plying stereophonic sounds.

The bottom right block of FIG. 5 shows a study unit 34 as another example of the outside units to be connected to the tape recorder according to the present invention. The study unit 34 comprises a microcomputer 35, a keyboard 36, a display means 37, an interface 38, and terminals 39A, 39B, 39C, and 39D corresponding to the terminals 25A, 25B, 25C, and 25D of the tape recorder 1. The terminal 39A is connected to a first output terminal 35F of the microcomputer 35. The terminal 39B is connected to a first input terminal 35A of the microcomputer 35. The terminal 39C is connected to a power source input terminal 35B of the microcomputer 35 and the first input terminal 38A of the interface 38. The terminal 39D is connected to an output terminal 38B of the interface 38. In addition, a second input terminal 35C of the microcomputer 35 is connected to an output terminal 36A of the keyboard 36. A second and a third output terminals 35D and 35E of the microcomputer 35 are connected to a second inut terminal (control input terminal) 38C of the interface 38 and an input terminal 37A of the display means 37, respectively.

Figure 7:
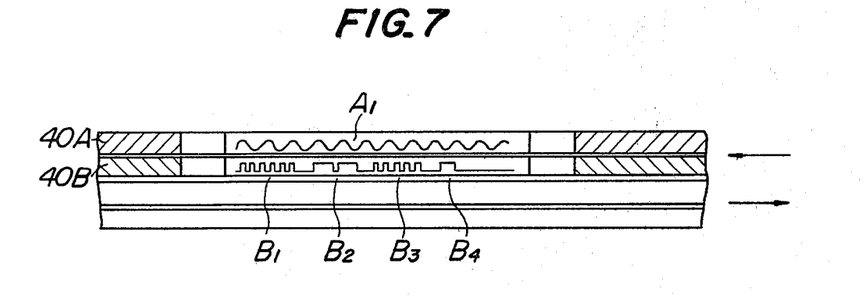

In the foregoing, when the tape recorder 1 is used by itself or together with the tuner unit 31, the first and second channels 20A and 20B are used for treating analog audio signals, but when the tape recorder 1 is used with the study unit 34 of the aforesaid construction, the track 40A of the study tape corresponding to the first channel 20A is used for analog audio signals $A_1$ representing questions, while the track 40B of the study tape corresponding to the second channel 20B is used for recording digital signals $B_1$ through $B_4$ representing questions, answers to the questions, and other control signals (see FIG. 7). Examples of the signals to be recorded on the track 40B of the study tape corresponding to the second channel are a question $B_1$, a discriminating signal of question and answer $B_2$, an answer $B_3$, and a tape-drive-stop instruction signal $B_4$, which signals may be suitably repeated in groups. It is apparent that one series of such signals constitute one step of study.

The combination of the tape recorder 1 and the study unit 34, as shown in FIG. 5, can be used together with the study tape of the aforesaid arrangement, for the purpose of effectively studying and preparing the study tape in the following manner.

(1) Reading a question:

When the pause button 10 is kept at the first selective position X and the study tape is being reproduced or played, the audio signals (a question) corresponding to the first channel 20A are reproduced by the speaker 22 through the switch 10B and the main amplifier 27A. At the same time, digital signals for one study step corresponding to that question, including the question, the discriminating signal of question and answer, the answer, and the tape-drive-stop instruction signal, are applied to the microcomputer 35 of the study unit 34 through the second channel 20B of the magnetic head 20, the selecting switch 11B, the main amplifier 27B, and the terminals 25B, 39B, and 35A. Then, the microcomputer 35 delivers output signals corresponding to the question to the display means 37 for visually displaying the question, stores the answer to the question in the memory thereof, and delivers the tape-drive-stop instruction signal to the interface 38 for interrupting the electric connection from the battery 23 of the tape recorder 1 to the pause switch 10A thereof. Accordingly, the power supply to the motor 29 is stopped at this moment, and the tape drive is interrupted accordingly. Thus, the question of the study tape is not only audibly confirmed by the speaker 22 but also visually confirmed by the display means 37.

(2) Writing an answer:

The student confirms the question audibly and visually, and thinks over for working out an answer to the question, and then applied the answer thus worked out to the microcomputer 35 by the keyboard as an input thereto. The microcomputer 35 compares the answer thus applied by the student against the correct answer prestored in the memory.

If the answer of the student coincides with the correct answer, the microcomputer indicates such coincidence on the display means 37. At the same time, the microcomputer 35 delivers a tape-drive-resume instruction signal to the interface 38, so as to complete the electric connection from the battery 23 to the servo-amplifier 28 of the motor 29. As a result, the tape drive is resumed, and the study proceeds to the next step, so that the reproduction of the next question can be effected in the same manner as the preceding paragraph (1).

On the other hand, if the answer from the student does not coincide with the correct answer and is found to be wrong, the microcomputer 35 indicates such lack of coincidence on the display means 37. In this case, however, the microcomputer 35 does not produce any tape-drive-resume instruction signal, so that the study cannot proceed to the next step. Hence, the student has to think over again about the question for working out a new answer to that question. If the new answer coincides with the correct answer, the study can proceed to the next step in the aforesaid manner, but if the new answer is wrong again, the student has to think again and put the new answer into the microcomputer 35 through the keyboard 36 until he succeeds in getting the correct answer.

In case of failing to produce the correct answer to one question by himself, the student can operate the keyboard 36 in such a manner that the microcomputer 35 delivers a tape-drive-resume instruction signal to the interface 38 while the student operates the FFRQR-actuating member 6, for rewinding the magnetic tape until the beginning of the study step of that question and reconfirm the question audibly and visually.

Similarly, the tape recorder can be made as an automatic reverse type with a program stored in the microcomputer 35 such that, if the student does not produce the correct answer to a particular question, the microcomputer 35 delivers a tape-reverse-drive instruction signal to the interface 38, so as to reversely drive the tape until reaching the position where the tape-drive-stop instruction signal of the preceding study step is recorded for repeatedly reproducing said particular question.

(3) Reading the correct answer:

If the student desires to read out the correct answer, he can operate the keyboard 36 for causing the correct answer stored in the microcomputer 35 to be displayed on the display means 37.

(4) Proceeding to the next step:

After confirmed the correct answer in the aforesaid manner, the student can similarly operate the keyboard 36, for causing the microcomputer 35 to deliver a tape-drive-resume instruction signal to the interface 38 so as to effect the operations of the aforesaid paragraphs (1) and (2) and the operation of the paragraph (3) if so desired.

(5) Preparing a study tape:

To facilitate the operations as described in the preceding paragraphs (1) through (4), a study tape as shown in FIG. 7 can be prepared in the following manner.

At first, the tape recorder 1 is used by itself, without being connected to the study unit 34. The pause button 10 is kept at the first selected position X for recording one question in the first and second tracks 40A and 40B of the magnetic tape through the microphone 7. Then, the tape recorder 1 is connected to the study unit 34 and the pause button 10 is set at the second selective position Z, for identifying the beginning of the question thus recorded. Before the beginning of the question, the tape recorder is set to the recording mode. Then, the keyboard 36 is so operated as to successively store the question $B_1$, discriminating signal of question and answer $B_2$, and the answer $B_3$ into the microcomputer 35, and thereafter those signals are delivered from the microcomputer 35 as the required digital signals to the tape recorder 1 through the terminals 35F, 39A and 25A for recording on the second track 40B of the magnetic tape. Finally, the keyboard 36 is so operated as to cause the microcomputer 35 to generate a tape-drive-stop instruction signal $B_4$.

The signal $B_4$ is also applied to the tape recorder 1 through the terminals 35F, 39A, and 25A, for recording the signal $B_4$ on the second track 40B of the magnetic tape. During this process, the signals being applied from the keyboard 36 to the microcomputer 35 are preferably indicated on the display means 37 in succession.

The aforesaid embodiment of the present invention includes a display means 37 mounted on the study unit, but if such display means is not provided, the correct answer can be recorded on the second track 40B of the magnetic tape as analog audio signals for facilitating audible confirmation by operating the pause button 10, and at the same time the correct answer is recorded also as digital signals for facilitating the comparison of the answer from the student through the keyboard against the correct answer and facilitating the ensuring tape drive control.

Figure 8:
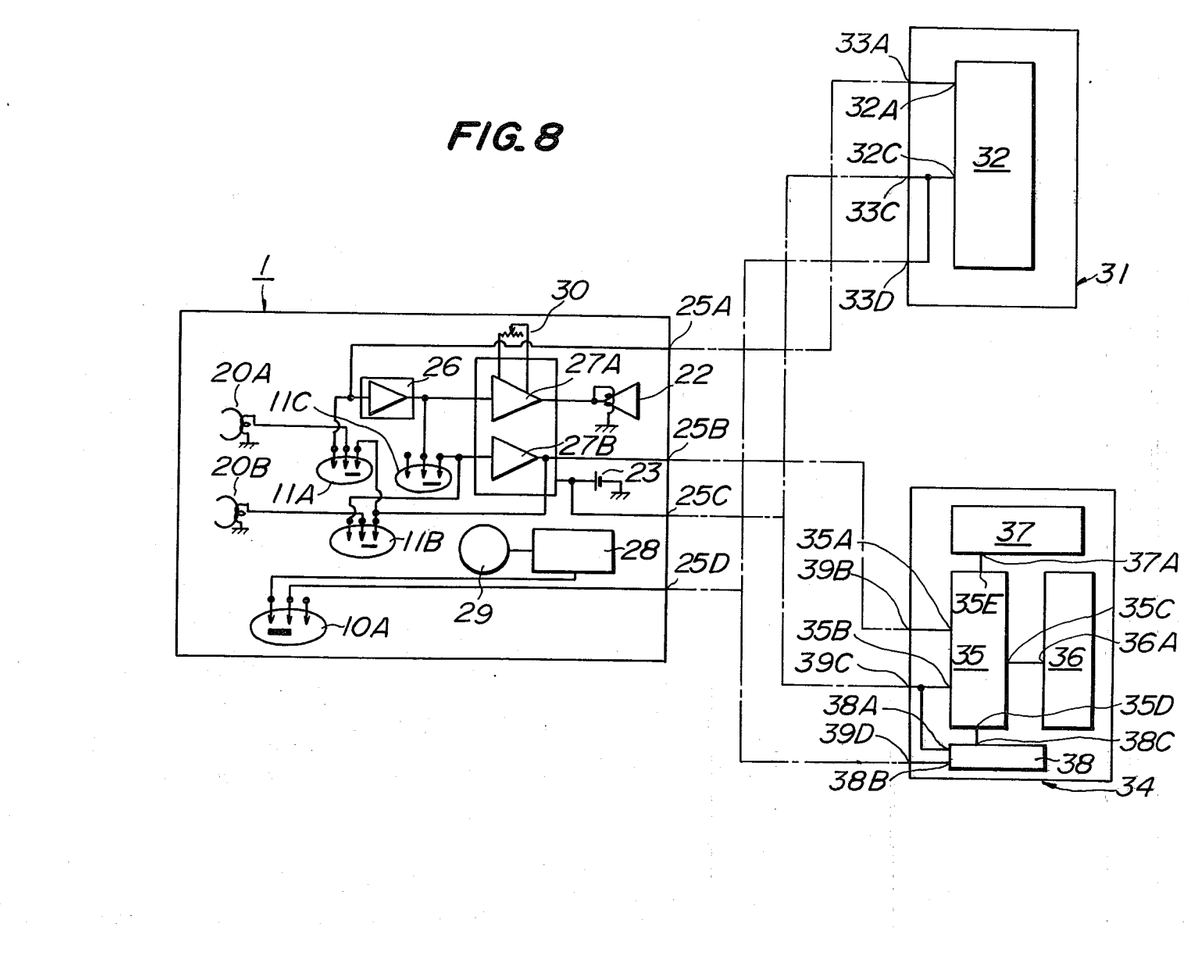
FIG. 8 is a block diagram like FIG. 5, illustrating another embodiment of electric circuit for the tape recorder according to the present invention and outside units to be connected thereto.

FIG. 8 illustrates another embodiment of the present invention, wherein like parts with those of FIG. 5 are designated by like symbols.

The differences between the embodiment of FIG. 5 and that of FIG. 8 are as follows. First of all, referring to pause switches 10A and 10B of FIG. 5, the switch 10A of FIG. 8, connected to a servo-amplifier 28, has only one open position and one close position. The other switch 10B is dispensed with in the embodiment of FIG. 8, and the input/output terminal of the channel 20A of a magnetic head 20 is connected only to a switch 11A. Correspondingly, the input/output terminal of the channel 20B of the magnetic head 20 is connected only to a switch 11B. Furthermore, the switch 11D of FIG. 5 is also dispensed with in the embodiment of FIG. 8, and a pre-amplifier 26 is provided, which pre-amplifier also functions as a level regulating circuit during the recording mode. The input side of the pre-amplifier 26 is connected to both the outside input terminal 25A and one output terminal of the switch 11A. The output terminal of the pre-amplifier 26 is connected to the input terminal of a main amplifier 27A and the input terminal of a switch 11C. The output terminal of the switch 11C is directly connected to both the input terminal of another main amplifier 27B and one input terminal of the switch 11B.

The electric circuit of the tape recorder of FIG. 8 may be such that, when the tape recorder 1 is connected to an outside unit at the outside input terminal 25A, output signals from the outside unit are applied to the pre-amplifier 26, while when the tape recorder 1 is not connected to any outside unit, output signals from a microphone 7 are applied to the pre-amplifier 26.

The tape recorder 1 of FIG. 8 can be operated substantially in the same manner as conventional regular tape recorders, as in the case of the preceding embodiment described hereinbefore by referring to FIG. 5. Furthermore, the embodiment of FIG. 8 has a complete interchangeability with other regular tape recorders and can be used in conjunction with a tuner 31 or a study unit 34.

More particularly, the tape recorder 1 of FIG. 8 has the switches 11A through 11C operated by a mode selecting switch 11, which are shown at the position for the recording mode, and the switch 10A operated by a pause button 10, which is shown at the pause-off position. As described above, when the tape recorder 1 is not connected to any outside unit, the input side terminal of the switch 10A is directly connected to the battery 23 through a change-over switch which is not shown. Accordingly, the tape recorder 1 effects the recording under the mode illustrated in FIG. 8.

Thus, the input signals to be recorded from the outside input terminal 25A or the microphone 7 are applied to the pre-amplifier 26, for automatic level control by the pre-amplifier 26. Then, the input signals to be recorded are applied, on one hand, to the main amplifier 27A for playing by the speaker 22, after being regulated at a desired level by the variable resistor 30, for monitoring the recording at the desired level. On the other hand, the input signals to be recorded are also applied to the main amplifier 27B through the selecting switch 11C. The output signals from the main amplifier 27B are applied to both the first channel 20A and second channel 20B of the magnetic head 20 through the selecting switches 11A and 11B, for simultaneous recording on the two tracks of the magnetic tape. Accordingly, the tape thus recorded can be reproduced or played by another monoral tape recorder adapted to magnetic tapes of the same standard.

Then, when the mode selecting switch 11 is moved to the reproducing or playing position, the output signals reproduced from the magnetic tape by the first channel 20A of the magnetic head are applied to the speaker 22 through the selective switch 11A, the pre-amplifier 26, and the main amplifier 27A, for playing at a desired level after being regulated by the variable resistor 30. On the other hand, the reproduced signals from the magnetic tape by the second channel 20B of the magnetic head are delivered to the terminal 25B through the selected switch 11B and the main amplifier 27B. Accordingly, the reproduced output signals from the second channel 20B are not played by the speaker 22, but can be played by an outside speaker (not shown) provided that the outside speaker is connected to the terminal 25B.

When the tape recorder 1 is connected to a tuner unit 31, connections between the microphone 7 and the preamplifier 26 and between the battery 23 and the pause switch 10A are interrupted. The output signals from a tuner circuit 32 are applied to the outside input terminal 25A, and the battery 23 is connected to the pause switch 10A through the terminals 33C and 33D of the tuner unit 31. Hence, the output signals from the tuner circuit 32 can be recorded on the tracks of the magnetic tape corresponding to the two channels 20A and 20B in the aforesaid manner.

Therefore, the tape recorder 1 as illustrated in FIG. 8 can be operated as a regular tape recorder having a radio, by connecting the tape recorder 1 to the tuner unit 31.

It has been assumed that the tape recorder 1 itself and the combination of the tape recorder and the tuner unit 31 treat analog audio signals at both the first and second channels 20A and 20B. However, referring to FIG. 7, when the tape recorder 1 is used as connected to the study unit 34 of the aforesaid construction, the track 40A of a magnetic tape corresponding to the first channel 20A is used for recording analog audio signals $A_1$ corresponding to a question, while the track 40B corresponding to the second channel 20B is used for recording digital signals $B_1$ through $B_4$ relating to the question, the answer to the question, and other control signals. The aforesaid magnetic tape is somewhat special and may be marketed separately as a study tape, and the special magnetic tape is not intended to be prepared by the tape recorder 1 of this embodiment. Examples of the digital signals to be recorded on the track 40B of the tape corresponding to the second channel 20B are the question $B_1$, the discriminating signal of question and answer $B_2$, the answer $B_3$, and the tape-drive-stop instruction signal $B_4$, and repetitions thereof. It is needless to say that the aforesaid series of the digital signals constitute each required step of study.

When the tape recorder 1 of FIG. 8 is used as being connected to the study unit 34, efficient study can be effected by using the study tape of the aforesaid construction in the following manner.

(1) Reproducing a question:

When signals from the study tape are reproduced, the analog audio signals (question) from the track corresponding to the first channel 20A are reproduced or played by the speaker 22, after being applied thereto through the selecting switch 11A, the preamplifier 26, and the main amplifier 27A. At the same time, the digital signals from one study step corresponding to the particular question, i.e., a series of digital signals for the particular question, the discriminating signal of question and answer, the answer, and the tape-drive-stop instruction signal, are applied to the microcomputer 35 of the study unit 34 through the second channel 20B of the magnetic head 20, the selecting switch 11B, the main amplifier 27B, and the terminals 25B, 39B, 35A. The microcomputer 35 delivers output signals corresponding to the question to the display means 37 for visually indicating the question, stores the answer in the memory of the microcomputer, and delivers the tape-drive-stop instruction signal to the interface 38 for interrupting the connection between the battery 23 and the pause switch 10A of the tape recorder 1. As a result, the power supply to the motor 29 is interrupted at this moment, and the tape driving is stopped. Thus, the question of the study tape is not only audibly confirmed by the speaker 22, but also visually confirmed by the display means 37.

(2) Writing the answer:

The student confirms the question audibly and visually, and thinks over for working out an answer to the question, and he applied the answer thus worked out into the microcomputer 35 by the keyboard 36 as an input thereto. The microcomputer 35 compares the answer thus applied by the student against the correct answer prerecorded in the memory.

If the answer of the student coincides with the correct answer, the microcomputer indicates such coincidence on the display means 37. At the same time, the microcomputer delivers a tape-drive-resume instruction signal to the interface 38, so as to complete the electric connection from the battery 23 to the servoamplifier 28 of the motor 29. Hence, the tape drive is resumed, and the study proceed to the next step, so that the reproduction of the next question can be effected in the same manner as the preceding paragraph (1).

On the other hand, if the answer from the student does not coincide with the correct answer and is found to be a wrong answer, the microcomputer 35 indicates such lack of coincidence on the display means 37. In this case, however, the microcomputer 35 does not produce any tape-drive-resume instruction signal, so that the study cannot proceed to the next step. As a result, the student has to think over again about the question for working out a new answer to that question. If the new answer coincides with the correct answer, the study can proceed to the next step in the aforewaid manner, but if the new answer is wrong again, the student has to think once again and put another new answer into the microcomputer 35 through the keyboard 36 until he succeeds in getting the correct answer. In the case of failing to produce the correct answer to one question by himself, the student can operate the keyboard 36 in such a manner that the microcomputer 35 delivers a tape-drive-resume instruction signal to the interface 38 while the student operates the FFRQR-actuating member 6, for rewinding the magnetic tape until the beginning of the study step of that question and reconfirm the question audibly and visually. Similarly, the tape recorder can be made as an automatic reverse type with a program stored in the microcomputer 35 such that, if the student does not produce the correct answer to a particular question, the microcomputer 35 delivers a tape-reverse-drive instruction signal to the interface 38, so as to reversely drive the tape until reaching the position where the tape-drive-stop instruction signal of the preceding study step is recorded for repeatedly reproducing said particular question.

(3) Reading the correct answer:

If the student desires to read out the correct answer, he can operate the keyboard 36 for causing the correct answer stored in the microcomputer 35 to be displayed on the display means 37.

(4) Proceeding to the next step:

After confirming the correct answer in the aforesaid manner, the student can similarly operate the keyboard 36, for causing the microcomputer 35 to deliver a tape-drive-resume instruction signal to the interface 38 so as to effect the operations of the aforesaid paragraphs (1) and (2) and the operation of the paragraph (3) if so desired.

As described in the foregoing, the tape recorder according to the present invention as a complete interchangeability with other conventional tape recorders by itself, and has an advantage of being usable as a combination of the tape recorder and a radio upon connection to a tuner unit for monoral or stereophonic recording and reproduction. Furthermore, when being connected to a study unit, the tape recorder of the present invention has another advantage of providing a very inexpensive study machine, as compared with conventional study machines having similar functions, while keeping the capability of being used as a regular tape recorder. Besides, as a study machine, the tape recorder of the present invention combined with a study unit has a further advantage of ensuring very efficient study, because the study machine is so arranged that only when a student has understood the correct answer to one question he is allowed to proceed to a next study step. Thus, the tape recorder of the present invention has highly advantageous effects over conventional tape recorders.

In addition to the tuner unit and the study unit, other outside units may be connected to the tape recorder of the present invention; for instance, a voice start unit for controlling the tape drive during the recording operation of audio signals, and a microcomputer unit for programmed reproduction of a tape.

Although the invention has been described with a certain degree of particulality, it is understood that the present disclosure has been made only by way of example and that numerous changes in details of construction and the combination and arrangement of parts may be resorted to without departing from the scope of the invention as hereinafter claimed.

What is claimed is:

1. A tape recorder comprising a two-channel magnetic head, two amplifying circuits, a record-actuating member, a reproduction-actuating member, said members being operable to effect recording and reproducing, and a selecting member operable without releasing said record-actuating member and said reproduction-actuating member so as to select one of different combinations of channels for recording and reproducing to be effected upon operation of said record-actuating member and said reproduction-actuating member, said selecting member having a plurality of selective positions including one selecting position where reproduced outputs from individual channels of said two-channel magnetic head are applied to the amplifying circuits of the corresponding individual channels for enabling simultaneous reproduction of signals of said channels, said tape recorder being adapted to read a magnetic tape having a first track with analog audio signals recorded thereon and a second track with digital control signals recorded thereon, said digital control signals relating to said analog audio signals on said first track and controlling one of said tape recorder and an outside unit connected to said tape recorder, said tape recorder further comprising a reproducing means for reproducing said analog audio signals from said first track, an output terminal for delivering said digital control signals of said second track to the outside unit, and a control input terminal for receiving control output signals generated by said outside unit based on the digital control signals of the second track, so as to control operation of said tape recorder in response to said control output signals thus received, said outside unit having a microcomputer, a keyboard, and an interface, and said magnetic tape has analog signals representing questions recorded on said first track and digital signals representing at least answers to said questions recorded on said second track, whereby the digital signals of said second track are delivered to the microcomputer of said outside unit through said output terminal, and the tape feeding in said tape recorder is interrupted after storing said digital signals in said microcomputer, for allowing a student to apply his answer to specific one of said questions onto said microcomputer by operating said keyboard and allowing said microcomputer to compare the answer from the student against said answer represented by said digital signals stored in the microcomputer and relating to said specific question, so as to control ensuing tape feeding in said tape recorder depending on result of said comparing by the microcomputer.

2. A tape recorder for use with a magnetic tape comprising: a two-channel magnetic head, a two-channel amplifying circuit, a record-actuating member, a reproduction-actuating member, said members being operable to effect recording and reproducing, respectively, a speaker for reproducing acoustically audio signals picked-up by said two-channel magnetic head from one of first and second tracks of magnetic tape, an output terminal for delivering a signal picked-up by the magnetic head from the second track of magnetic tape to an outside unit, and a selecting member operable without releasing said record actuating member and said reproduction-actuating member so as to select one of different combinations of tracks for recording and reproducing to be effected upon operation of said actuating members, said selecting member having a plurality of selective positions including one position where the signal reproduced from the first track of magnetic tape is applied to the speaker and the signal reproduced from the second track is applied to the output terminal, said tape recorder is adapted to read the magnetic tape having the first track with analog audio signals recorded thereon and the second track with digital control signals recorded thereon, said digital control signals relating said analog audio signals on the first track and controlling the tape recorder and the outside unit connected to the tape recorder, said tape recorder further comprising: a control input terminal for receiving control output signals generated by said outside unit based on the digital control signals, and a control member for controlling operation of the tape recorder in response to said control output signals thus received.

3. A tape recorder as set forth in claim 2, wherein said tape recorder further comprises a switching member for selectively supplying the audio signals picked-up by the magnetic head from the first and second tracks of magnetic tape to said speaker, whereby the tape recorder is made operable as a study unit without the outside unit.

4. A tape recorder as set forth in claim 2, wherein the outside unit connected to the output terminal comprises a speaker and the magnetic tape has right and left hand audio signals of stereo signals recorded on the first and second tracks, respectively, so that the combination of the tape recorder and the outside unit is made operable as a stereo magnetic tape player.

5. A tape recorder as set forth in claim 2, wherein the tape recorder further comprises a switching member in a first mode of which the same signals can be recorded on both the first and second tracks of magnetic tape and in the second mode the signals can be recorded on the second track of magnetic tape.

* * * * *